UNITED STATES PATENT OFFICE.

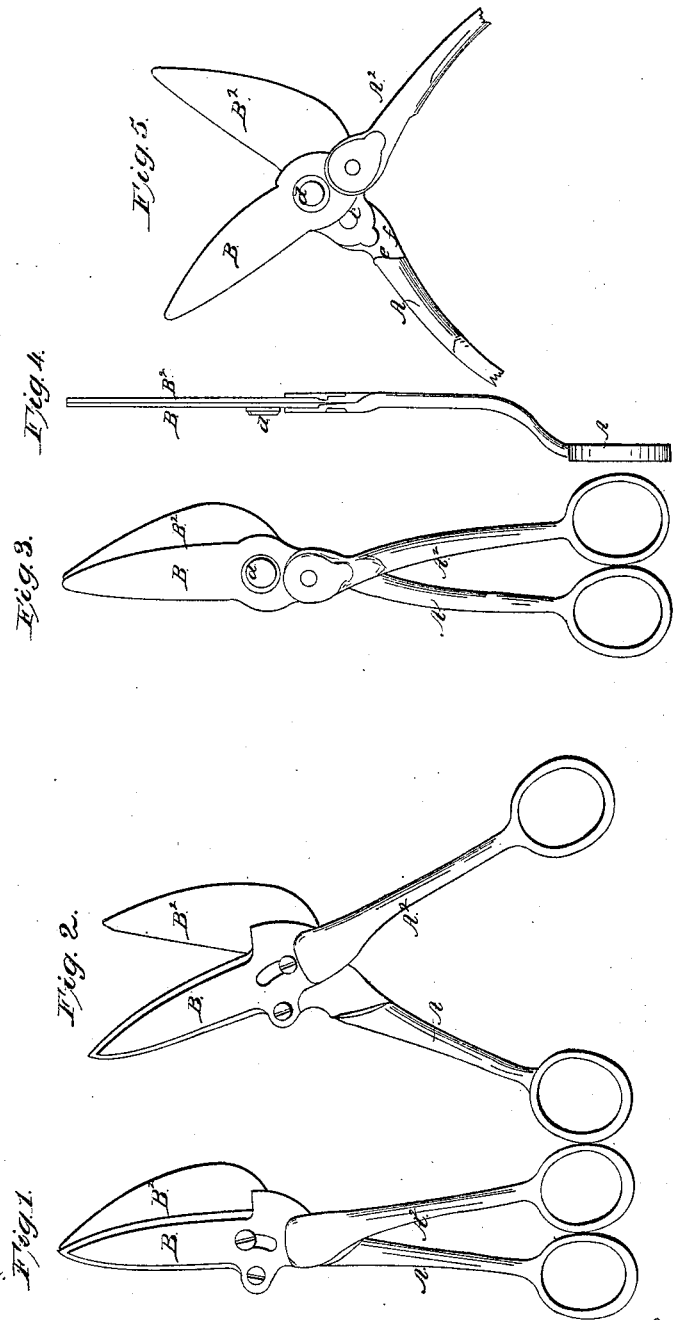

LUTHER C. WHITE, OF WATERBURY, CONNECTICUT.

IMPROVEMENT IN SCISSORS.

Specification forming part of Letters Patent No. 53,719, dated April 3, 1866.

*To all whom it may concern:*

Be it known that I, LUTHER C. WHITE, of Waterbury, in the county of New Haven and State of Connecticut, have invented, made, and applied to use certain new and useful Improvements in the Manufacture of Scissors and Shears; and I do declare the following to be a full, clear, and correct description of the same, reference being had to the accompanying drawings, making part of this specification, and to the letters of reference marked thereon, in which—

Figure 1 is a view of a pair of shears, made in the ordinary manner, closed; Fig. 2, a view of the same when open; Fig. 3, a view of a pair of shears, made in my improved way, closed; Fig. 4, an end view of the same; Fig. 5, a view of the same when open.

In the drawings like parts of the invention are indicated by the same letters of reference.

The nature of my invention consists in forming the shoulders upon the handles of the scissors or shears some distance back of the point of riveting the cutting-blades to said handles, so that a recess or space shall be left between the point of riveting the blades to the handles and the shoulders.

The object of my invention is to cheapen the cost of manufacturing scissors or shears, and at the same time secure greater uniformity in the temper and quality of the shears produced.

To enable those skilled in the arts to make and use my invention, I will speak of the same.

Scissors or shears are usually made by welding the cutting-blades to the handles and then grinding down and polishing the same. When the blades are welded closely to the shoulders upon the handles, as clearly shown in Figs. 1 and 2 of the drawings, the blades cannot be ground down and polished save at a heavy cost, and then only for a portion of their length, the portions of the cutting-blades which are contiguous to the shoulders upon the handles being filed down by hand.

In the drawings, A and $A^2$ are the handles of the shears, and B and $B^2$ the cutting-blades of the same.

$c$ shows the point at which the blades are riveted to the handles, and $d$ the point for riveting one portion of the shears to the contiguous portion.

In my improvement I construct the handles A and $A^2$ in the usual way, and provide them with the shoulders $e$.

The blades B and $B^2$, instead of being welded to the handles A and $A^2$ flush with the shoulders $e$, are riveted, as at $c$, so that a recess, $f$, is left between the point of riveting and the shoulders.

After the blades are riveted they may be readily ground down and polished, and as the recess $f$ exists, as shown, no filing is required.

By the use of my improvement I greatly cheapen the cost of manufacture and at the same time secure greater uniformity in the temper and quality of the shears produced, as they are not subjected to the heat necessary to weld the blades to the handles.

Having thus described my invention, what I claim as new, and desire to secure by Letters Patent, is—

Forming a shoulder upon the handles of scissors or shears so that a recess shall be left between the same and the blades when riveted thereto, for the purposes herein specified.

LUTHER C. WHITE.

In presence of—
  GEO. E. TERRY,
  S. M. CATE, Jr.